(12) United States Patent
Fourie et al.

(10) Patent No.: US 6,537,342 B1
(45) Date of Patent: Mar. 25, 2003

(54) INDUCTION FURNACE FOR A METAL REDUCTION AND MELTING PROCESS

(75) Inventors: Louis Johannes Fourie, Pretoria (ZA); Johan Pierre Devilliers, Pretoria (ZA)

(73) Assignee: Ipcor NV, Curacao (AN)

( * ) Notice: Subject to any disclaimer, the term of this patent is extended or adjusted under 35 U.S.C. 154(b) by 0 days.

(21) Appl. No.: 09/743,831

(22) PCT Filed: Jul. 13, 1999

(86) PCT No.: PCT/IB99/01281
§ 371 (c)(1),
(2), (4) Date: Mar. 9, 2001

(87) PCT Pub. No.: WO00/04197
PCT Pub. Date: Jan. 27, 2000

(30) Foreign Application Priority Data

Jul. 17, 1998 (ZA) .............................................. 98/6361

(51) Int. Cl.⁷ .............................................. C21B 11/10
(52) U.S. Cl. ...................... 75/10.14; 75/10.15; 266/234; 373/161

(58) Field of Search .............................. 75/10.14, 10.15; 373/142, 144, 138, 162, 161; 266/234

(56) References Cited

U.S. PATENT DOCUMENTS 4,808,219 A  *  2/1989  Metz .......................... 75/10.14
5,411,570 A      5/1995  Fourie
6,206,948 B1 *  3/2001  Fourie et al. ............... 75/10.14

FOREIGN PATENT DOCUMENTS

WO         WO 97/40197       10/1997

* cited by examiner

*Primary Examiner*—Melvyn Andrews
(74) *Attorney, Agent, or Firm*—Fish & Richardson P.C.

(57) ABSTRACT

Apparatus for a metal reduction and melting process, in which a metal and carbon-containing burden is heated in an induction furnace including a heating vessel in which the burden can float in at least one heap on a liquid metal bath in the vessel, is characterized in that the apparatus includes at least one induction heater or inductor located at the bottom center line of the vessel, with the longitudinal access oriented perpendicular to the access of the vessel.

21 Claims, 1 Drawing Sheet

INDUCTION FURNACE FOR A METAL REDUCTION AND MELTING PROCESS

TECHNICAL FIELD

THIS invention relates to an apparatus for a metal reduction and melting process such as, for example, a steelmaking process, in which a metal and carbon containing burden is heated in a channel type induction furnace in order to reduce and melt the metal containing part of the burden.

BACKGROUND ART

The conventional channel type induction furnace usually comprises an elongated tubular heating vessel which is of substantially circular configuration in cross section, and which is heated by two circumferentially spaced, longitudinally disposed, rows of induction heaters, or inductors, of which each row extends along the bottom of the vessel on opposite sides of the longitudinally extending centre line of the vessel.

One such a furnace is, for example, disclosed in U.S. Pat. No. 5,411,570, where it is used for the reduction and melting of a metal and carbon containing burden.

In the aforesaid USA process, the burden is introduced to the heating vessel through two circumferentially spaced apart, longitudinally disposed rows of ports located in the upper wall of the vessel, with the result that the burden floats on the molten metal bath in the vessel as two wedge shaped heaps which each extends along an opposite side of the vessel's wall, with the wider end of the wedge, i.e. the 'apex' of the heap, being located towards the vessel's wall, and the narrower end of the wedge, i.e. the 'toe' of the heap, towards the middle of the vessel. As a result of this, the apices of the heaps that float on the metal bath are located almost vertically above the inductor throats (openings).

Since the metal is heated by the $I^2R$ losses in the inductor, and a convective upward flow of relatively hot metal is caused directly above the inductor throat, more heat reaches the undersides of the heaps in those areas located almost directly under their apices than in other areas. (Hot spots are formed below the highest points of the rows of heaps.) Burden particles are therefore "consumed" mainly in the said areas located almost directly under the apices of the heaps, resulting in a net flow of particles towards these areas.

The flow of burden particles in the heaps can be represented by vectors. Such flow vectors can relate to flow perpendicular to the surface of the heap, and flow parallel thereto. Flow perpendicular to the heap surface is undesirable because heat absorbed as a result of radiation from the roof of the vessel onto the surface can effectively only be conducted to depths in the order of 25 mm. This means that once a particle has travelled approximately 25 mm perpendicular to the surface, it is effectively screened from such radiation. The time required for this movement can be termed the "exposure" time.

Reduced exposure times of particles result in reduced radiant energy absorption by these particles. This in turn implies that other particles that reach the toes of the heaps, where the heating rate and hence melting rate caused by the inductors is lower, are exposed to radiation for longer periods than would otherwise be the case. Extended exposure times in turn imply higher surface temperatures and hence reduced radiant heat transfer rates to the material at the toes of the heaps. The relatively high temperatures and high degree of reduction of material at the toes of the heaps may also result in reoxydation because of the lack of protection by reducing gas. (Reduction reactions are completed, hence no CO gas is formed in this region to protect the burden from reoxydation by $CO_2$.

Both over exposure and under exposure of burden particles to radiation are undesirable because of the resultant higher electrical power and reductant consumption.

A further disadvantage found with the aforesaid known arrangement is that the significant difference between the processing of the burden material that reaches the toes of the heaps and the material that does not, results in a significant difference in the ratio of carbon and oxygen available by the time the particles are melted. The relative quantities of these differently constituted materials reaching the liquid bath are greater when high power input rates are applied. When the inhomogeneity so created reaches the stage where the excess carbon dissolved in the one area, and the excess oxygen dissolved in the other area, when mixed, exceed their solubility level, carbon monoxide gas is liberated. Such gas evolution results in disruption of the process and potentially dangerous conditions. The maximum rate of electrical power input must therefore be restricted to relatively low levels, which, of course, reduces the production rates that can be reached.

In the aforesaid known arrangement the minimum liquid metal level for normal operation is restricted by the requirement that the row of inductors furthest away from the tapping spout of the furnace must always be below the metal level, even when the furnace is tilted farthest to the tapping side. This restriction, and the requirement that the heaps must be formed to completely cover the metal bath, reduces the space available for forming heaps and for combusting the gasses emitted from the burden or fuel that may be introduced to the furnace. Depending on the angle of repose of the heaps, the projected surface area for heat transfer to the heaps is also restricted by the restriction in the minimum liquid metal level.

A further feature of such known arrangement is that both single or double loop inductors are always mounted with their channels parallel to the longitudinal axis of horizontal drum furnaces. This means that the normally oval throat openings have their longitudinal axes parallel to the longitudinal center line of the furnace. Since the inductor throats are usually separated by significant refractory material walls that support the rest of the refractory lining of the furnace, the number of inductors in a row per unit length of furnace is restricted. Hot spots are therefore formed typically 4 to 5 meters apart. This feature further adds to the inhomogeneity of the movement of material in the heaps.

OBJECT OF THE INVENTION

It is an object of this invention to provide an apparatus for the aforesaid purpose with which the aforesaid problems can be overcome or at least minimized.

DISCLOSURE OF THE INVENTION

According to the invention apparatus for a metal reduction and melting process, in which a metal and carbon containing burden is heated in an induction furnace comprising a heating vessel in which the burden can float in at least one heap on a liquid metal bath in the vessel, is provided, characterized in that the apparatus includes at least one induction heater or inductor which is located at or towards the bottom center line of the vessel.

Preferably the furnace comprises a channel type induction furnace.

Further according to the invention such at least one induction heater serves as the only external heating source of the vessel.

Further according to the invention, the vessel is of elongated tubular configuration and includes a plurality of such inductors which are located in a row which extends longitudinally along the bottom center line of the vessel.

Still further according to the invention the vessel includes towards its upper end a plurality of ports through which burden can be loaded into the vessel, the ports being arranged in two spaced apart longitudinally extending rows so that burden loaded through them will extend as two adjacently located heaps floating on the liquid metal bath, the heaps each being of wedge shape configuration in cross section, with the wider end or 'apex' of a heap being located towards the wall of the vessel and the narrower end or 'toe' towards the middle of the vessel.

It will be appreciated that with such an arrangement the heaps will be heated directly below their 'toes' and the average velocity of movement of the burden particles perpendicular to the surface of the heaps elsewhere will hence be minimised, so that most of the burden material will be consumed at or near the toes of the heaps (i.e. in the valley formed between the two rows of heaps), and therefore directly above the inductors.

With this arrangement one can accordingly guard against the possibility that the burden particles are either under or over exposed to radiation in the furnace.

Furthermore, because of the central location of the inductors, the liquid level of the metal bath in the vessel, and hence the volume of the liquid metal itself, can be made much lower than what the case is with the aforesaid known arrangements, in this manner preventing the inhomogeneity referred to earlier, and accordingly also giving rise to a reduction in the electrical power requirement.

Further according to the invention the inductors are so mounted that their longitudinal axes extend at substantially right angles relative to the longitudinal axis of the furnace.

It will be appreciated that with such an arrangement more inductors can be installed per unit of length of the vessel, and the number of hot spots formed under the valley between the rows of heaps is increased because the distance between the hot spots is reduced.

Further according to the invention the configuration of the apparatus is such, and the reaction conditions inside the vessel so controlled, that the burden extends in the manner of a bridge over the whole of the liquid metal bath.

Such an arrangement will ensure that substantially all the reduction of the metal takes place in the burden, i.e. in the solid phase.

The said configuration of the apparatus may, for example, relate to the number and/or location of the aforesaid ports through which the burden is loaded into the vessel.

The said control of the reaction conditions, again, may be effected by controlling any one or more of the following:
1. The rate at which burden is supplied to the vessel;
2. The particle size of the burden;
3. The degree of mixing of the metal and carbon containing components of the burden;
4. The rate at which heat is supplied to the vessel by the induction heater(s);

The rate at which heat is generated by any gas(es) and/or other fuels burnt in the vessel in the space above the heaps.

The heat referred to in 5 (above) may, for example, be from burning carbon monoxide escaping from the burden in the vessel with oxygen-, or oxygen/air mixture-, burners located in the vessel in the area above the burden.

The heat formed as a result of such burning, as well as the radiant heat reflected from the roof of the vessel, may be utilized for at least preheating the burden inside and/or outside the vessel.

Further according to the invention the air/or air/oxygen mixture utilized in said burners may contain a finely divided material which can 'glow' at the temperatures resulting form such burning of the carbon monoxide and/or fuel above the heaps.

Such 'glow' improves the radiancy of the flame, thus increasing its heating effect on the burden.

The finely divided material may, for example, comprise soot.

The finely divided material may also include or comprise lime.

Such lime may assist in the removal of sulphur from the gases present in the furnace.

Further according to the invention the vessel includes at least one outlet port for the molten metal and/or slag formed during the reaction.

Still further according to the invention the metal making process comprises a steelmaking process in which a mixture of carbon in the form of finely divided coal or coke, and a suitable iron oxide containing ore in finely divided form, is heated in the vessel to cause the reduction of the iron oxide and the melting of the resulting steel, which can then be tapped as steel containing less than 0.1% carbon.

BRIEF DESCRIPTION OF THE DRAWINGS

One embodiment of the invention will now be described by way of example with reference to the enclosed drawings, in which.

BEST MODE FOR CARRYING OUT THE INVENTION

Figure 2:
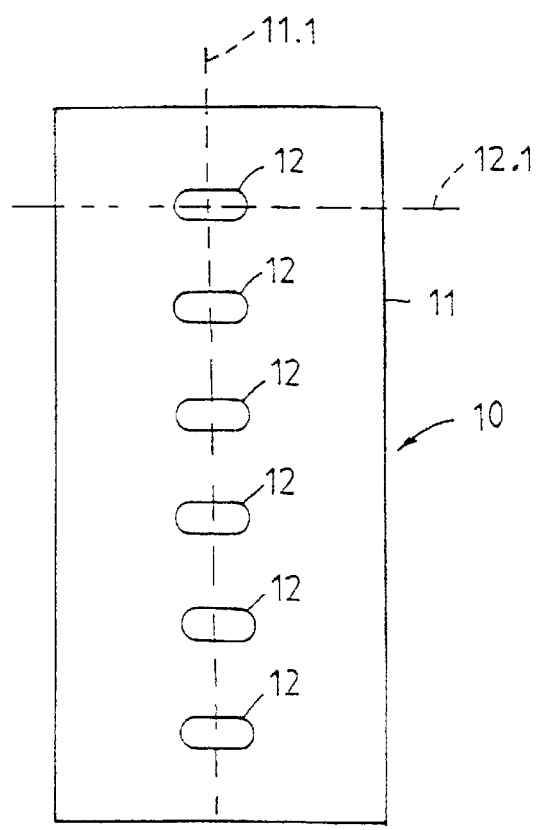
FIG. 2 is a bottom plan view of the furnace of FIG. 1 as seen in the direction of arrow 'A' in FIG. 1.

In this embodiment of the invention a channel type induction furnace 10 is utilized which comprises an elongated tubular vessel 11 of circular configuration in cross section, which is provided along its bottom center line 11.1 (FIG. 2) with a plurality of electrically operated inductors 12, each of a capacity in the order of 2.2 MW.

Inductors 12 are so located that their longitudinal axes 12.1 (FIG. 2) extend at right angles to centre line 11.1.

Figure 1:
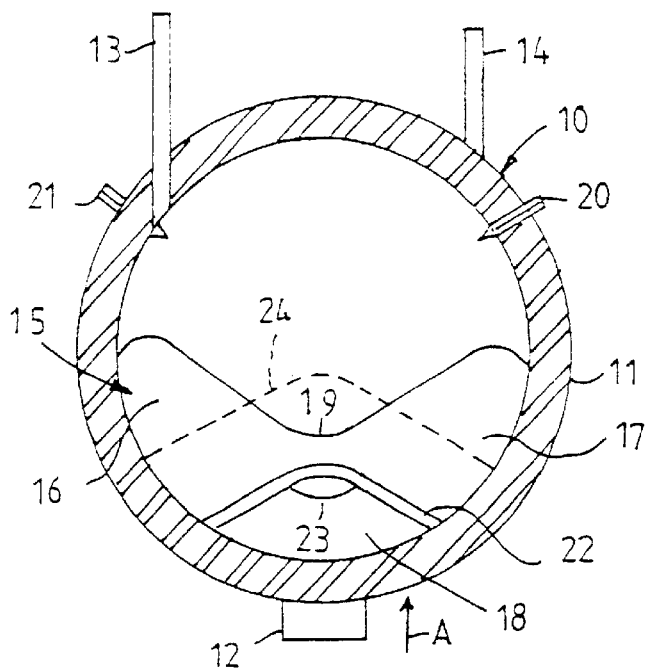
FIG. 1 is a diagrammatic cross sectional view through a furnace according to the invention.

Vessel 11 includes two parallel extending rows of feeding ports of which only one of each, 13 and 14, is shown in FIG. 1, which extend along opposite longitudinal sides of vessel 11. These ports are utilized for introducing a burden 15 to vessel 11 to form two longitudinally extending heaps 16 and 17 which float on a liquid metal bath 18, and which are each of substantially wedge shape in cross section, with the wider end of each wedge, i.e. the apex of the heap, being located towards the wall of vessel 11, and the narrower end of the wedge, i.e. the 'toe ' of the heap, being located towards center line 11.1 of vessel 11.

If required, a small supply of liquid metal can at the start of the process be introduced to vessel 11 through a feeding port, not shown, to form the initial metal bath.

Burden 15 comprises a homogeneous mixture in particulate form of a carbon containing compound such as coal, for example, and iron oxide; the carbon containing compound being present in a concentration slightly less than that representing the stoichiometric amount of carbon necessary for reducing the ore; and the particle size of burden 15 being such that it can pass through a 3 mm sieve.

Vessel 11 is also provided along its upper wall with a plurality of oxygen burners, of which only two, 20 and 21, are shown in FIG. 1, and by means of which the CO which forms in the reaction, and which permeates through the upper layer of burden 15, can be burnt.

Burden 15 is introduced into vessel 11 in such a manner and at such a rate, and the reaction conditions so controlled, as disclosed earlier in this specification, that the bottoms of heaps 16 and 17 merge with each other so that the burden material 15 forms a 'bridge' which extends over the whole of liquid bath 18, such 'bridge' being at its narrowest at the zone indicated as 19.

The fact that such a bridge has been formed, and in fact remains intact, can, for example, be established by means of a 'dip stick' (not shown) which is inserted from above into vessel 11, or by means of a suitable inspection window (not shown) in the wall of vessel 11. It may also be established by means of a suitable image recording apparatus (also not shown) located inside vessel 11.

In operation, a reaction zone is created in burden 15 of heaps 16 and 17 which extends virtually from the bottoms of the heaps to their upper ends. At the same time a melting zone 22 is formed which extends between the bottoms of heaps 16 and 17 and the upper surface of liquid bath 18. During the reaction the reduced burden 15 moves under the influence of gravity from the reaction zone towards melting zone 22.

The slag which is formed during such melting floats on top of bath 18 in a tunnel 23 which extends along center line 11.1 below melting zone 22. Tunnel 23 leads to a slag exit port (not shown) in vessel 11, and burden feed ports 13 and 14 are so arranged relative to such slag exit port that the slag in tunnel 23 is directed to such slag exit port. Molten steel (±0.1% carbon).

During the operation of the process, the said 'bridge' serves to prevent any burden material 15 from falling directly from heaps 16 and 17 into the slag in tunnel 23, or into the liquid metal in bath 18, thus preventing any 'short circuiting'.

The heat supplied to bath 18 through inductors 12 diffuses into burden 15 in heaps 16 and 17 and this, together with the heat from the CO being burnt by burners 20 and 21, and the radiant heat being reflected from the roof of vessel 11, causes the iron oxide and carbon of burden 15 to react, which results in the reduction of the iron oxide. Almost all of such reduction, which accordingly takes place in the solid phase, takes place in the uppermost 20 mm layer of heaps 16 and 17, mainly due to the additional heat being supplied to such layer from the burning of the CO by burners 20 and 21, and the radiant heat reflected from the roof of vessel 11. At the same time the solid reduced iron is melted in zone 22, from where it passes under gravity into bath 18.

It will be appreciated that, because of the central location of inductors 12, the 'toes' of heaps 16 and 17 will receive most of the heat from inductors 12 so that the burden particles 15 will mainly be consumed in area 19.

This will mean that the flow of burden particles along the upper surfaces of heaps 16 and 17 will be mainly parallel to such surfaces, thus preventing the 'underexposure' and 'overexposure' problem referred to above.

Furthermore, such central location of inductors 12 also allows for the employment of a much lower liquid level for metal bath 18 than what the case is with the aforesaid known arrangement (indicated by dotted line 24 in FIG. 1), thus giving rise to the advantages referred to above.

Furthermore, because of the 'transverse' location of inductors 12 relative to central line 11.1, more inductors 12 per unit length of vessel 11 can be utilized than what the case is with the aforesaid known arrangements, so that the number of hot spots under the valley between the rows of heaps 16 and 17 is increased relative to such known arrangements.

It will be appreciated further that the invention also includes within its scope a metal reduction and melting process which utilizes the apparatus according to the invention.

What is claimed is:

1. A metal reduction and melting process utilizing an apparatus in which a metal and carbon containing burden is heated in a channel induction furnace, the apparatus comprising a tubular heating vessel in which the burden can float in at least one heap on a liquid metal bath in the vessel and including at least one induction heater or inductor located along the bottom center line of a bottom surface of the vessel.

2. The process of claim 1, characterized in that its configuration is such, and the reaction conditions inside the vessel so controlled, that the burden extends in the manner of a bridge over the whole of the liquid metal bath.

3. The process of claim 2, characterized in that its said configuration relates to the number and/or location of the ports through which the burden is loaded into the vessel.

4. The process of claim 2, characterized in that the said control of the reaction conditions is effected by controlling any one or more of the following:
   1. The rate at which burden is supplied to the vessel;
   2. The particle size of the burden;
   3. The degree of mixing of the metal and carbon containing components of the burden;
   4. The rate at which heat is supplied to the vessel by the induction heater(s)
   5. The rate at which heat is generated by any gas(es) and/or other fuels burnt in the space above the heaps in the vessel.

5. The process of claim 4, characterized in that the heat referred to in point 5 is obtained from burning carbon monoxide escaping from the burden in the vessel with oxygen- or oxygen/air mixture-burners located in the vessel in the area above the burden.

6. The process of claim 5, characterized in that the heat formed as a result of such burning, as well as any radiant heat reflected from the roof of the vessel, is utilized for at least preheating the burden inside and/or outside the vessel.

7. The process of claim 5, characterized in that the air and/or oxygen mixture utilized in said burners contains a finely divided material which can 'glow' at the temperature resulting from such burning of the carbon monoxide and/or fuel above the heaps.

8. The process of claim 7, characterized in that the finely divided material comprises soot.

9. The process of claim 7, characterized in that the finely divided material includes or comprises lime.

10. The process of claim 1, characterized in that the vessel includes at least one outlet port for molten metal and at least one exit port for slag formed during the reaction.

11. The process of claim 1, characterized in that the metal making process comprises a steel making process in which a mixture of carbon in the form of finely divided coal or coke, and a suitable iron oxide containing ore in finely divided form, is heated in the vessel to cause the reduction of the iron oxide and the melting of the resulting steel, which can then be tapped as steel containing less than 0.1% carbon.

12. The process of claim 6, characterized in that the air and/or oxygen mixture utilized in said burners contains a finely divided material which can 'glow' at the temperature resulting from such burning of the carbon monoxide and/or fuel above the heaps.

13. The process of claim 12, characterized in that the finely divided material comprises soot.

14. The process of claim 12, characterized in that the finely divided material includes or comprises lime.

15. The process of claim 13, characterized in that the finely divided material includes or comprises lime.

16. The process of claim 8, characterized in that the finely divided material includes or comprises lime.

17. Apparatus for a metal reduction and melting process in which a metal and carbon containing burden is heated in a channel induction furnace comprising a tubular heating vessel in which the burden can float in at least one heap on a liquid metal bath in the vessel, characterized in that the furnace includes at least one induction heater or inductor located along the bottom center line of a bottom surface of the vessel.

18. The apparatus of claim 17, characterized in that the at least one induction heater serves as the only external heating source of the vessel.

19. The apparatus of claim 17, characterized in that the vessel is of elongated tubular configuration, and that it includes a plurality of inductors which are located in a row which extends longitudinally along the bottom center line of the vessel.

20. The apparatus of claim 17, characterized in that the vessel includes towards its upper end a plurality of ports through which burden can be loaded into the vessel, the ports being arranged in two spaced apart longitudinally extending rows so that burden loaded through them can extend as two adjacently located heaps floating on the liquid metal bath, the heaps each being of wedge shape configuration in cross section, with the wider end or 'apex' of a heap being located towards the wall of the vessel and the narrower end or 'toe' of a heap being located towards the middle of the vessel.

21. The apparatus of claim 17, characterized in that the or each inductor is so mounted that its longitudinal axis extends at substantially right angles relative to the longitudinal axis of the furnace.

* * * * *